(12) United States Patent
Raghoebardajal et al.

(10) Patent No.: US 9,811,908 B2
(45) Date of Patent: Nov. 7, 2017

(54) HEAD-MOUNTABLE APPARATUS AND SYSTEMS

(71) Applicant: Sony Interactive Entertainment Europe Limited, London (GB)

(72) Inventors: Sharwin Winesh Raghoebardajal, London (GB); Ian Henry Bickerstaff, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 14/896,859

(22) PCT Filed: Jun. 11, 2014

(86) PCT No.: PCT/GB2014/051804
§ 371 (c)(1),
(2) Date: Dec. 8, 2015

(87) PCT Pub. No.: WO2014/199160
PCT Pub. Date: Dec. 18, 2014

(65) Prior Publication Data
US 2016/0155231 A1    Jun. 2, 2016

(30) Foreign Application Priority Data

Jun. 11, 2013 (GB) .................. 1310359.3
Aug. 21, 2013 (GB) .................. 1314968.7
Jun. 11, 2014 (GB) .................. 1410426.9

(51) Int. Cl.
*G06K 9/46* (2006.01)
*G06T 7/00* (2017.01)
(Continued)

(52) U.S. Cl.
CPC .......... *G06T 7/0026* (2013.01); *A63F 13/211* (2014.09); *A63F 13/212* (2014.09);
(Continued)

(58) Field of Classification Search
CPC .... A63F 13/211; A63F 13/212; A63F 13/213; A63F 13/428; A63F 13/5258;
(Continued)

(56) References Cited

U.S. PATENT DOCUMENTS 5,796,426 A * 8/1998 Gullichsen ............ G06T 3/0018
                                                348/147
5,856,844 A * 1/1999 Batterman .............. G01S 5/163
                                                345/158

(Continued)

FOREIGN PATENT DOCUMENTS

EP    0391498 A1    10/1990
EP    1541966 A1    6/2005
(Continued)

OTHER PUBLICATIONS

Examination report for EP Application 14732314.1 dated Nov. 7, 2016.
(Continued)

*Primary Examiner* — Mekonen Bekele
(74) *Attorney, Agent, or Firm* — Lerner, David, Littenberg, Krumholz & Mentlik, LLP

(57) ABSTRACT

A head mountable display (HMD) is provided that has an upward facing camera associated with a wide angle (such as a fisheye) lens arranged to capture images of the environment of the HMD. The HMD also includes an image comparator arranged to derive an indication of yaw of the HMD from images captured by the upward facing camera at different points in time. The image comparator may be configured to perform two or more detection techniques to detect HMD yaw, and to combine the results of the two or more detection techniques. The HMD may also include a tilt detector. Here, the image comparator may be configured to ignore one or more portions of a captured image in depen-
(Continued)

dence upon a current tilt of the HMD as detected by the tilt detector.

18 Claims, 16 Drawing Sheets

(51) Int. Cl.
| | |
|---|---|
| G02B 27/01 | (2006.01) |
| A63F 13/428 | (2014.01) |
| A63F 13/211 | (2014.01) |
| A63F 13/213 | (2014.01) |
| A63F 13/5258 | (2014.01) |
| A63F 13/212 | (2014.01) |
| G06F 3/01 | (2006.01) |
| G06K 9/62 | (2006.01) |
| G06T 3/00 | (2006.01) |
| H04N 5/232 | (2006.01) |
| G06T 7/32 | (2017.01) |
| G06T 7/70 | (2017.01) |
| G06T 7/73 | (2017.01) |
| G06T 7/246 | (2017.01) |

(52) U.S. Cl.
CPC .......... *A63F 13/213* (2014.09); *A63F 13/428* (2014.09); *A63F 13/5258* (2014.09); *G02B 27/017* (2013.01); *G02B 27/0172* (2013.01); *G06F 3/011* (2013.01); *G06K 9/6202* (2013.01); *G06T 3/0093* (2013.01); *G06T 7/246* (2017.01); *G06T 7/32* (2017.01); *G06T 7/70* (2017.01); *G06T 7/73* (2017.01); *H04N 5/23238* (2013.01); *G02B 2027/014* (2013.01); *G02B 2027/0123* (2013.01); *G02B 2027/0138* (2013.01); *G02B 2027/0187* (2013.01); *G06T 2207/10016* (2013.01)

(58) Field of Classification Search
CPC ... G02B 27/017; G02B 27/0172; G06F 3/011; G06K 9/6202; G06T 3/0093; G06T 7/0026; G06T 7/0042; G06T 7/2033; G06T 7/246; G06T 7/32; G06T 7/70; G06T 7/73

See application file for complete search history.

(56) References Cited

U.S. PATENT DOCUMENTS

| | | | | | |
|---|---|---|---|---|---|
| 6,307,526 | B1* | 10/2001 | Mann | .................. | G02B 27/017 345/7 |
| 9,310,884 | B2* | 4/2016 | Benson | ................ | G02B 27/017 |
| 2002/0075201 | A1 | 6/2002 | Sauer et al. | | |
| 2002/0085843 | A1* | 7/2002 | Mann | ..................... | E03C 1/057 396/374 |
| 2003/0179249 | A1* | 9/2003 | Sauer | ..................... | G06F 3/011 715/848 |
| 2004/0179104 | A1 | 9/2004 | Benton | | |
| 2004/0246463 | A1 | 12/2004 | Milinusic | | |
| 2005/0078202 | A1* | 4/2005 | Kiso | ....................... | H04N 1/387 348/239 |
| 2006/0050087 | A1 | 3/2006 | Tanimura et al. | | |
| 2010/0157433 | A1 | 6/2010 | Mukawa et al. | | |
| 2011/0234584 | A1 | 9/2011 | Endo | | |
| 2012/0133780 | A1* | 5/2012 | Zhang | .................. | G06T 7/0018 348/187 |
| 2013/0293688 | A1* | 11/2013 | Benson | ................ | G02B 27/017 348/53 |
| 2014/0160129 | A1* | 6/2014 | Sako | ........................ | G06F 3/011 345/427 |
| 2016/0180591 | A1* | 6/2016 | Shiu | ................... | G02B 27/0172 345/633 |
| 2016/0246061 | A1* | 8/2016 | Bickerstaff | ............. | G06F 3/012 |

FOREIGN PATENT DOCUMENTS

| | | | |
|---|---|---|---|
| EP | 1577836 | A2 | 9/2005 |
| EP | 1731943 | A1 | 12/2006 |
| WO | 9413100 | A2 | 6/1994 |
| WO | 2006120279 | A1 | 11/2006 |
| WO | 2007017476 | A1 | 2/2007 |

OTHER PUBLICATIONS

International Search Report for Application No. PCT/GB2014/051804, dated Jul. 31, 2014.
3D Focus, Jun. 21, 2012, "BBC workng on virtual reality style head tracking system", [online], Available from: http://www.3dfocus.co.uk/3d-news-2/3d-technology/bbc-working-onvirtual-reality-style-head-tracking-system/8793 [Accessed Nov. 26, 2014].
Wang et al, "Tracking a head-mounted display in a room-sized environment with head-mounted cameras", Proceedings of SPIE 1290, Helmet-mounted displays II (Oct. 1, 1990).
Combined Search and Examination Report for Application No. GB1410426.9 dated Nov. 28, 2014.
Simon et al, 'Markerless Tracking using Planar Structures in the Scene', Proc. IEEE & ACM Symposium on Augmented Reality 2000 (ISAR 2000), pp. 120-128.
Search Report for Application No. GB1314968.7 dated Feb. 27, 2014.
Search Report for Application No. GB1310359.3 dated Dec. 19, 2013.

* cited by examiner

LEFT                RIGHT

HEAD-MOUNTABLE APPARATUS AND SYSTEMS

CROSS REFERENCE TO RELATED APPLICATION

The present application is a national phase entry under 35 U.S.C. §371 of International Application No. PCT/GB2014/051804, filed Jun. 11, 2014, published in English, which claims the benefit of and priority to of GB Patent Application No. 1310359.3, filed Jun. 11, 2013 and GB Patent Application No. 1314968.7, filed Aug. 21, 2013 the entire disclosures of which are hereby incorporated by reference herein. The present application also claims the benefit of and priority to GB Patent Application No. 1410426.9, filed Jun. 11, 2014, the entire disclosure of which is hereby incorporated by reference herein.

BACKGROUND

Field of the Disclosure

This invention relates to head-mountable apparatus and systems.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is one example of a head-mountable apparatus. Audio headphones comprising a frame supporting one or more audio transducers are another example of a head-mountable apparatus. A head-mounted torch or light is a further example of a head-mountable apparatus. The following background discussions will relate mainly to HMDs, but the principles are also applicable to other types of head-mountable apparatus.

In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present invention are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
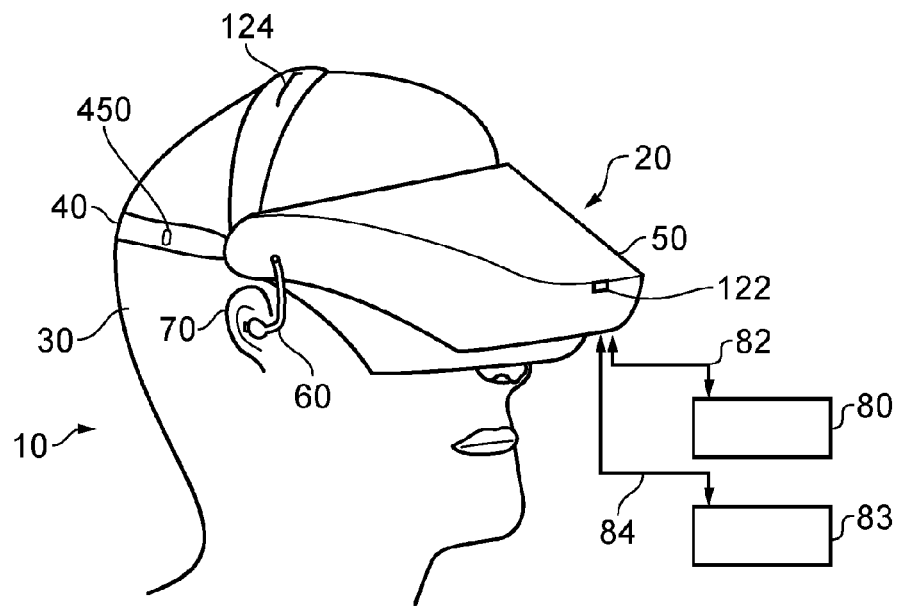
FIG. 1 schematically illustrates an HMD worn by a user.

Referring now to FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
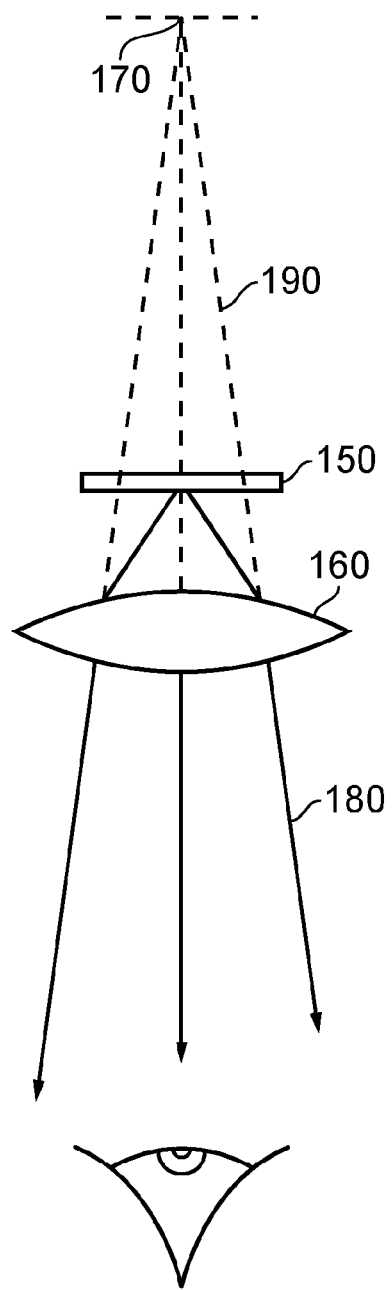
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
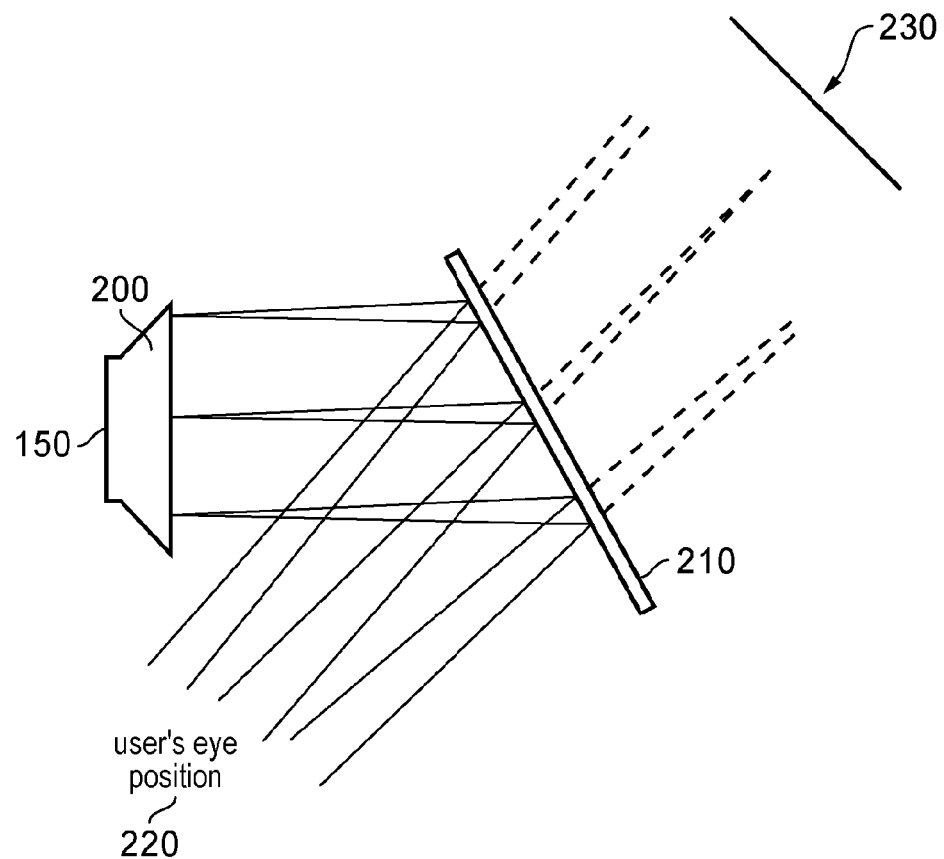
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
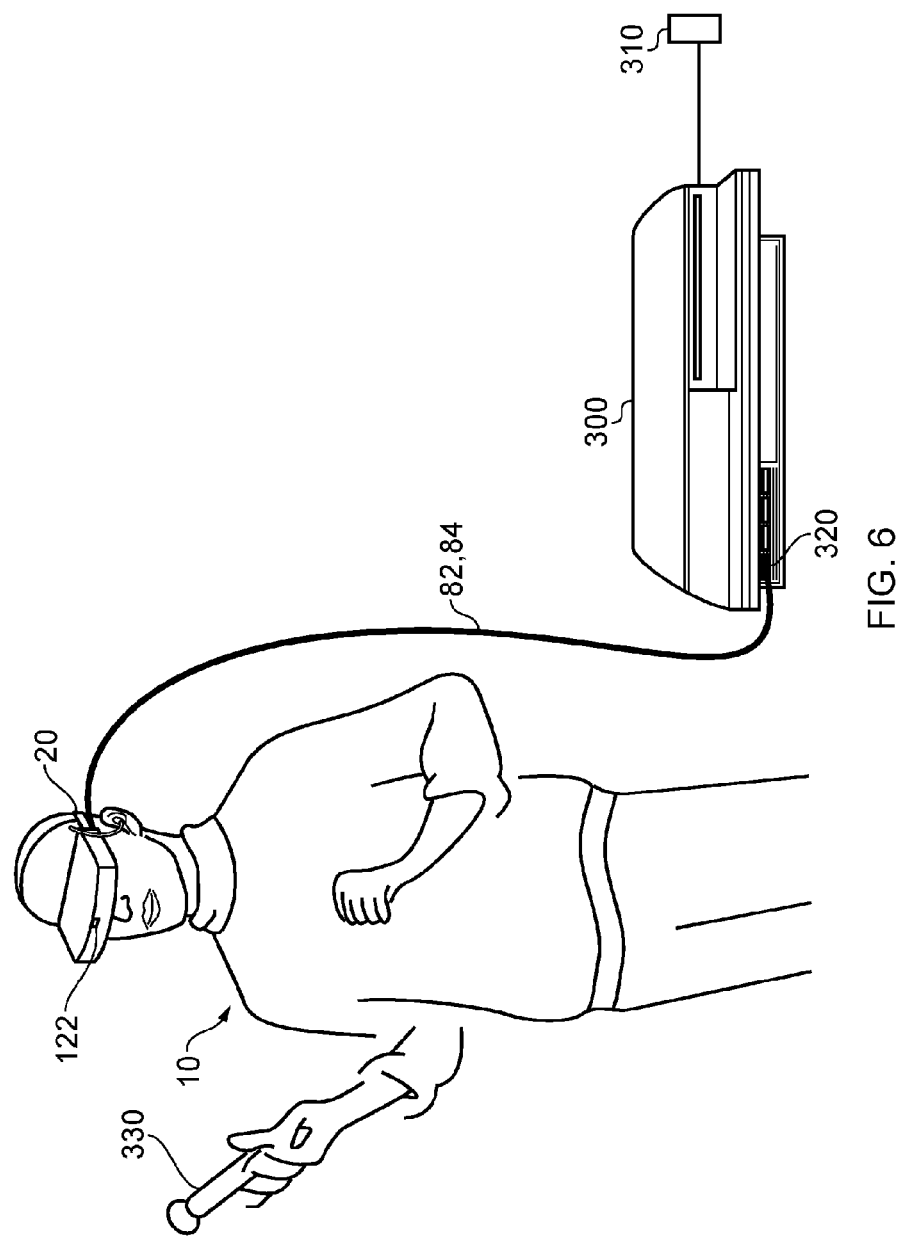
FIGS. 6 and 7 schematically illustrate a user wearing an HMD connected to a Sony® PlayStation 3® games console.

FIG. 6 schematically illustrates a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a hand-held controller 330 which may be, for example, a Sony® Move® controller which communicates wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 7:
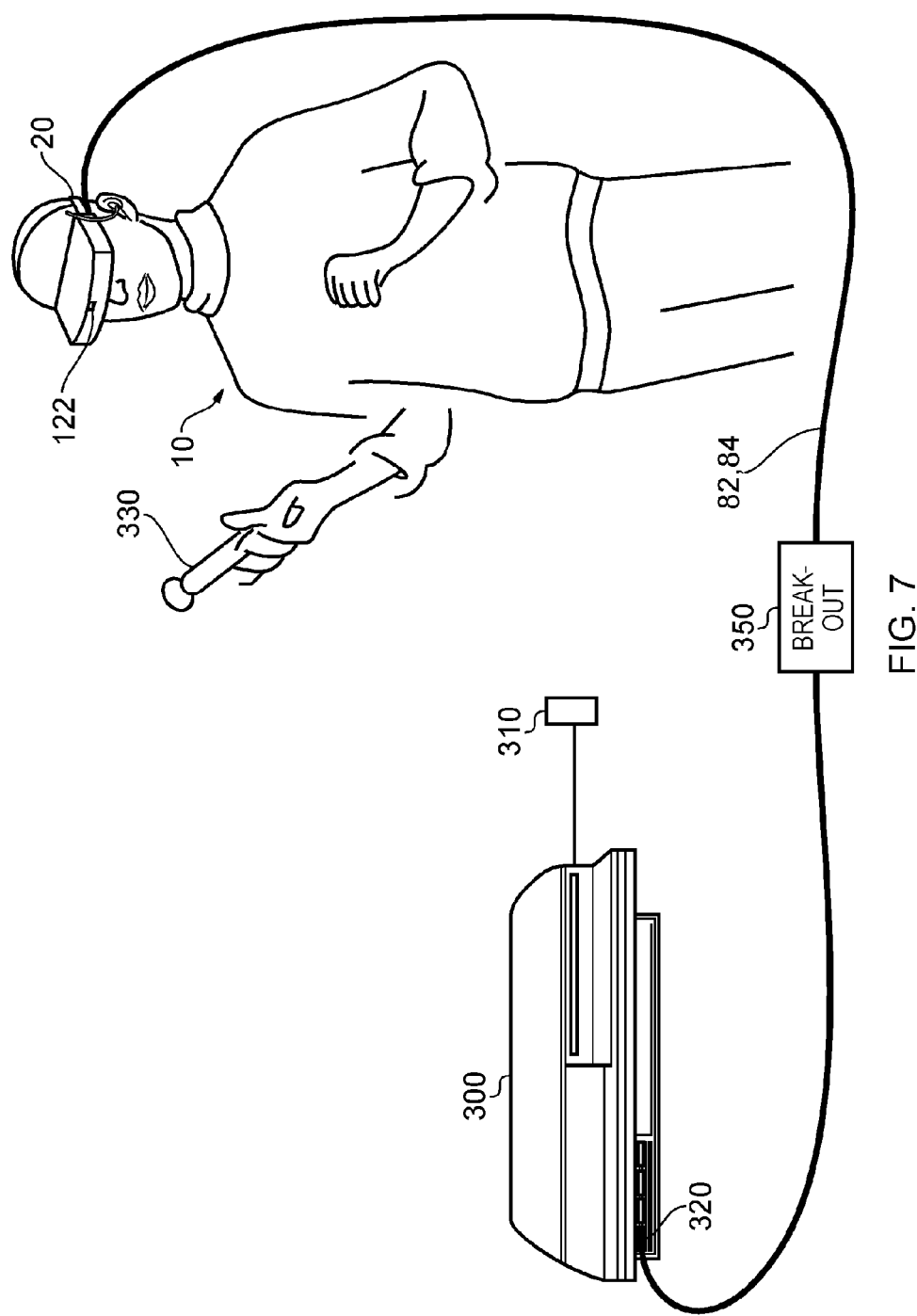

FIG. 7 schematically illustrates a similar arrangement in which the games console is connected (by a wired or wireless link) to a so-called "break out box" acting as a base or intermediate device 350, to which the HMD 20 is connected by a cabled link 82,84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
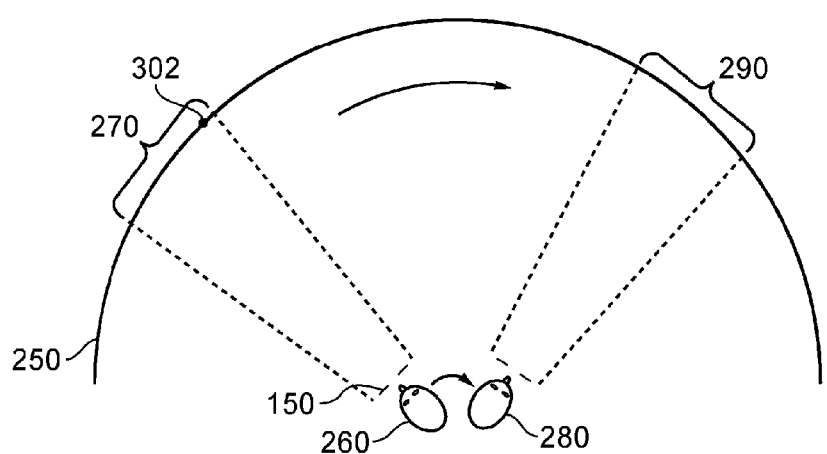
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
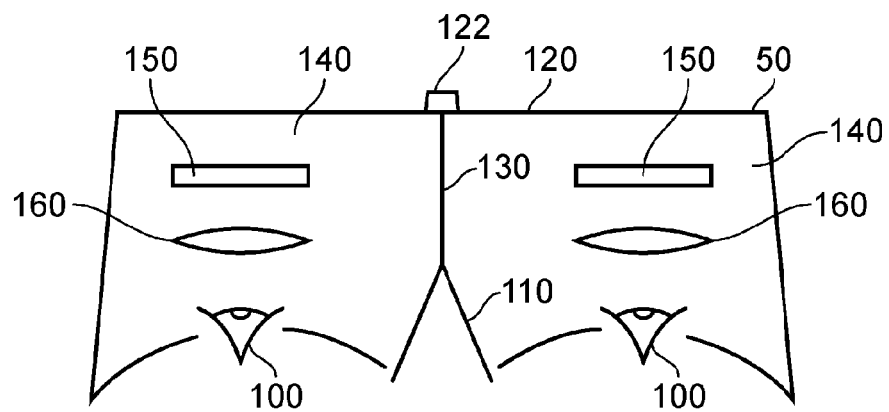
FIG. 2 is a schematic plan view of an HMD.
Figure 9A:
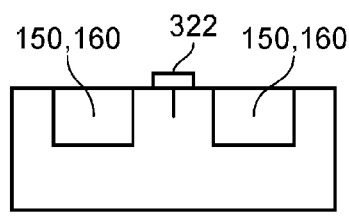
FIGS. 9a and 9b schematically illustrate HMDs with motion sensing.
Figure 9B:
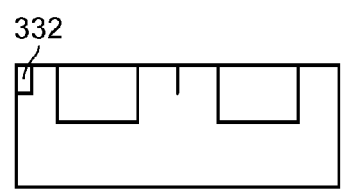

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
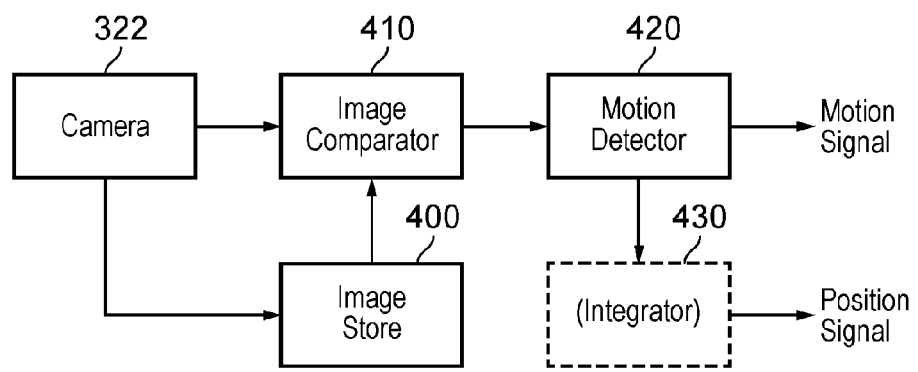
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
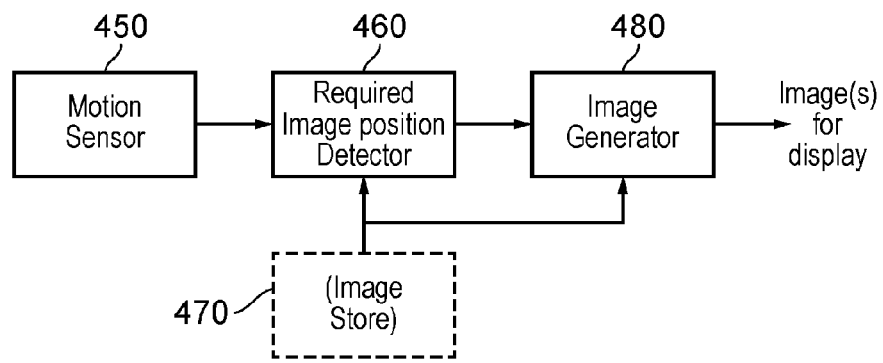
FIG. 11 schematically illustrates the generation of images in response to HMD position or motion detection.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

It has been proposed that an embodiment of an HMD may include solid-state or mechanical motion detection. Example arrangements have been discussed above. In some cases, this type of motion detection is operable to detect a time derivative of the current position, which is to say either velocity or acceleration. A common type of motion detector is an accelerometer which detects acceleration. In order to obtain a position from the detection of acceleration, an integration process has to be used. An artefact of integration of this type is that it can suffer from so-called drift, which is to say that over time, errors can build up in an absolute position detection obtained by integration of acceleration detection.

This drift is a particular problem in the context of yaw detection, which is a detection of the rotational position of the HMD with respect to a horizontal plane. An accurate detection of yaw is important in the field of videogame play as well is for the replay of video material.

The embodiments to be discussed below address this problem in one of two ways.

An optical detection of yaw is discussed below. In some embodiments, this can be used as a correction for a conventional yaw detection, for example by integration of acceleration measure. In other embodiments, the optically detected yaw can be used in its own right, that is to say, not as a correction of another measure but as the measure itself.

The basis of this technique is the use of a generally upward facing wide angle lens associated with a camera, or mounted with respect to the HMD so as to rotate in the horizontal plane with the HMD. For example, a suitable position for the upward facing lens and camera may be on a top strap of the HMD which passes over the top of the wearers head in use.

A particular example of a suitable lens is a so-called fisheye lens. Such a lens has a field of view (shown as "FOV" in FIG. 12) of substantially 180° or even more, possibly extending as far as 210° or more. However, the present techniques could operate with different types of wide-angle lens, for example lens having a field of view of at least 140°.

Figure 12:
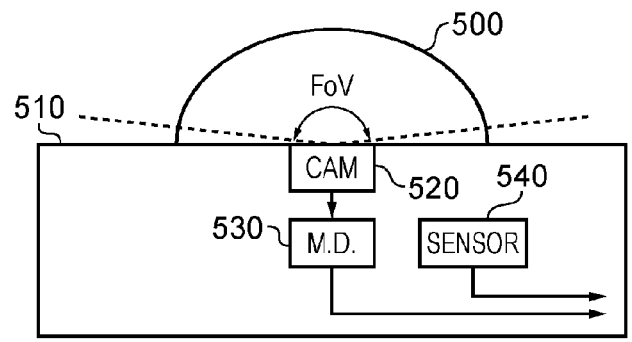
FIG. 12 schematically illustrates a fisheye lens mounted on an HMD.

FIG. 12 schematically illustrates a fisheye lens 500 mounted on an HMD (shown schematically as 510). The fisheye lens is associated with a camera 520 which captures images using the fisheye lens. A motion detector 530 acts in real time or substantially in real time upon the images captured by the camera 520. The HMD 510 also includes an acceleration sensor 540. The interaction of the various parts shown in FIG. 12 will be discussed in more detail below.

Figure 13:
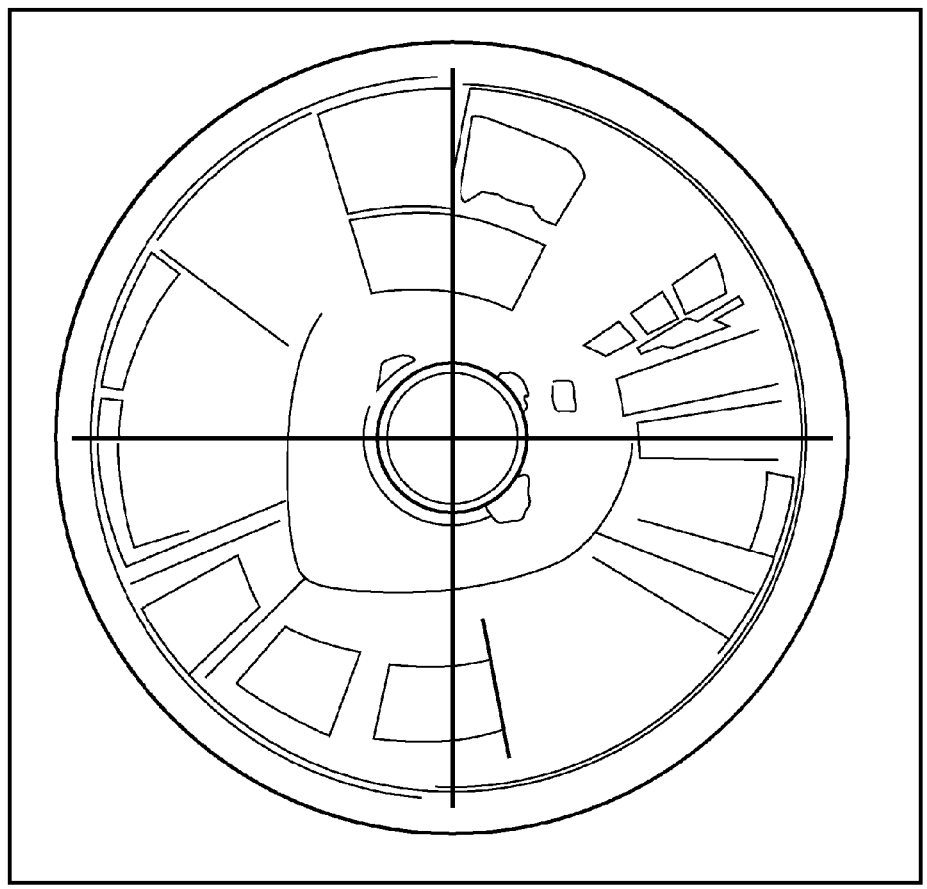
FIG. 13 schematically illustrates an image captured by the lens of FIG. 12.

FIG. 13 schematically illustrates an image captured by the upward facing lens of FIG. 12. The image includes a representation of environment features the whole way around the HMD, albeit with significant distortion. So, environment features which are laterally displaced from the HMD appear around the peripheral edges of the image. Environment features which are above the HMD appear in the centre of the image.

Note that in some lenses, the area directly above the lens (corresponding to a central area of the image of FIG. 13) is not captured, because of features of the particular optics in use. This is not important to the present techniques, as the more significant image material is contained around the outer edges of the captured images.

Although the images of the type shown in FIG. 13 can be processed directly, in embodiments of the present invention the images are subject to a so-called image warping process in order to convert the circular representation of FIG. 13 into a linear representation so that environment features which are laterally spaced away from the HMD are represented at different linear positions along a linear image rather than at different rotational positions around a circular image.

Figure 14:
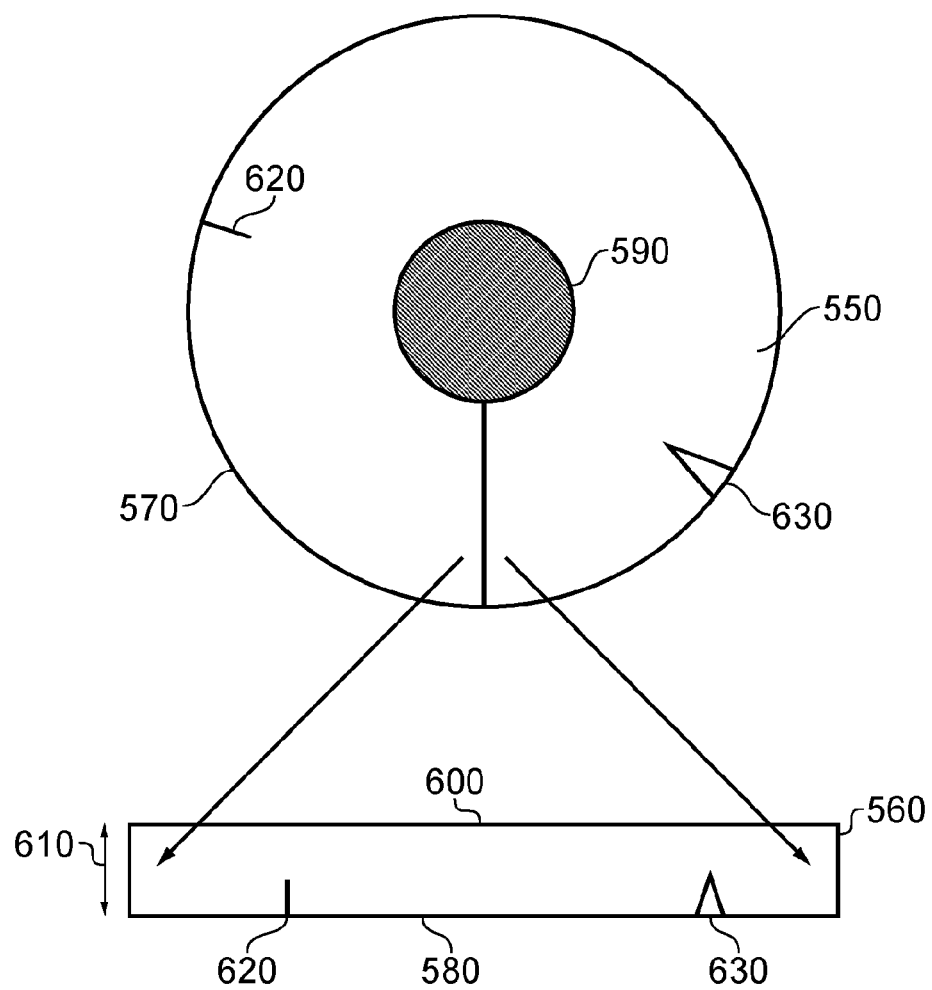
FIG. 14 schematically illustrates an image warping process.

FIG. 14 schematically illustrates such an image warping process. An outer annular region 550 of the fisheye image is mapped to a linear representation 560 such that the outer circumference 570 of the annular region maps to (in this example) the lower edge 580 of the linear representation and the inner circumference 590 of the annular region maps to the upper edge 600 of the linear representation, radial positions in between the inner and outer circumference is mapped to corresponding positions in a vertical direction 610 of the linear representation and angular positions around the annular region 550 mapped to corresponding horizontal positions along the linear representation. By way of example, to image features 620, 630 are shown in the original image and also at their mapped positions in the linear representation.

Various techniques can then be used to detect rotational movement of the HMD by comparing successive captured images (as captured using the fisheye lens). The techniques to be discussed in connection with FIGS. 15 and 16 are described in the context of the linear representations obtained by the image warping process (so as to map a rotational movement between two captured images into a linear movement between two warped images), but it will be understood by the skilled person that these techniques could be applied directly to the circular images such as that shown in FIG. 13.

Figure 15:
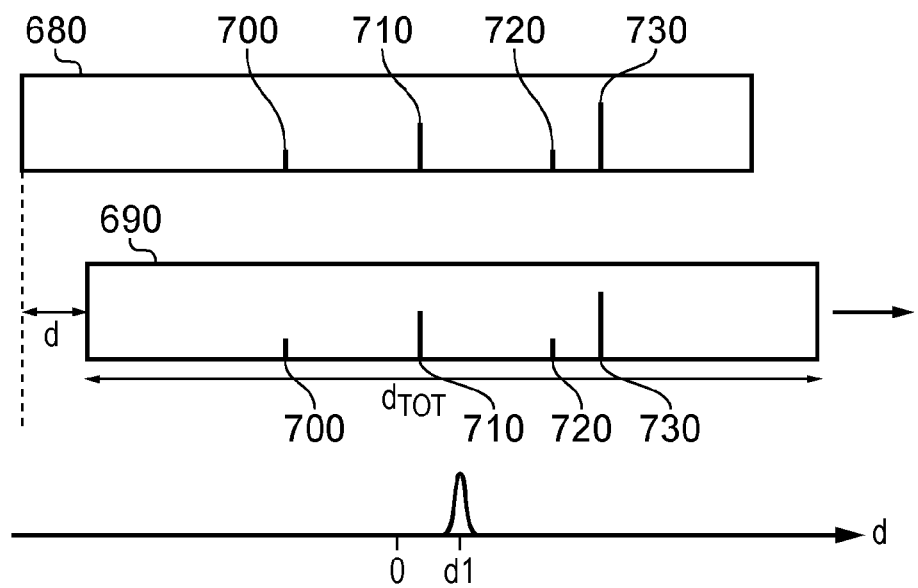
FIG. 15 schematically illustrates a correlation process.

FIG. 15 schematically illustrates a correlation process between the linear representations corresponding to two captured images 680, 690 which are captured at different points in time. These may be successively captured images (at an image capture rate of, for example, 50 images per second) or may be images separated in time by, for example, 0.1 seconds. The process illustrated in FIG. 15 may be carried out by the motion detector 530 of FIG. 12.

Between the two images, a number of image features 700, 710, 720, 730 have moved. The assumption here is that if a number of spaced apart image features have moved by a corresponding amount, this represents movement (that is to say, rotation and lateral plane) of the HMD rather than a particular individual feature of the environment itself moving. In order to test for the amount of movement between the successive images 680, 690, the correlation between the two images is detected at different respective offsets d between the two images. The lower line of FIG. 15 illustrates the correlation obtained as a function of the offset d, showing that a peak in correlation is obtained at an offset value d1. The offset d1 is taken to be a representation of the motion of the HMD between the catch times of the two images. This can be expressed as an angular motion by dividing d1 by the total extent $d_{TOT}$ of the linear representation corresponding to a full 360° of the original image, and multiplying by 360°. In other words, $$\text{angular movement} = 360° \times d1/d_{TOT}$$

Figure 16:
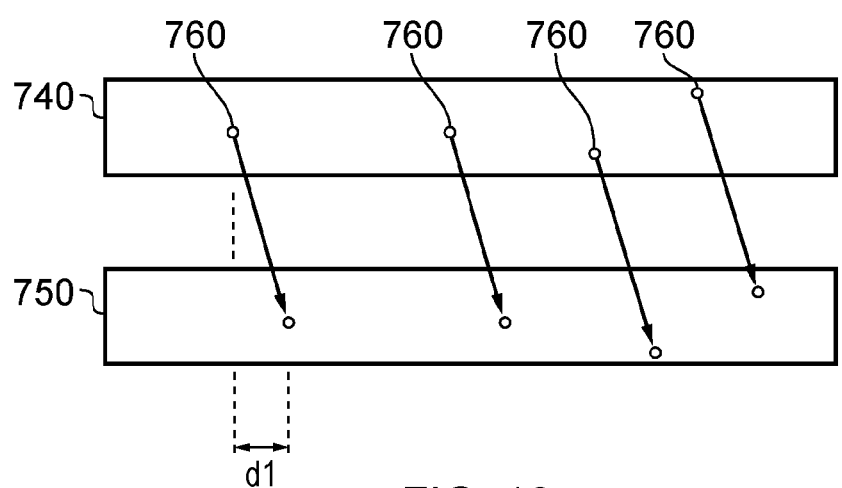
FIG. 16 schematically illustrates a feature point matching process.

FIG. 16 schematically illustrates a feature point matching process as another example of a technique for deriving the degree of image rotation between two captured images 740, 750 in their linear representations. So-called feature points 760 are identified in each of the captured images. For example, feature points may be point identified as corners using known feature point detection techniques. The position of each feature point is compared with the corresponding position of that feature point in the other image, to establish an offset amount d1, which can be converted into an angular movement between the two images using the same techniques as those described in connection with FIG. 15.

The techniques described above rely on identifying image features between the successively captured images. In situations where this may be difficult, so-called structured light may be used to create such feature points. In particular, patterns of light beams may be projected onto the ceiling or walls of the environment surrounding the HMD, and the detection, in a captured image, of these patterns can form at least some of the features to be compared in the context of FIG. 16, and/or can assist in the correlation process shown in FIG. 15. Note that the light sources should not be mounted on the HMD, or the detected points in the images would always move with the HMD and so would not give any information about rotation of the HMD relative to its environment. Instead, the light sources are mounted with respect to a fixed or quasi fixed point such as a games console or a break-out box.

Figure 17:
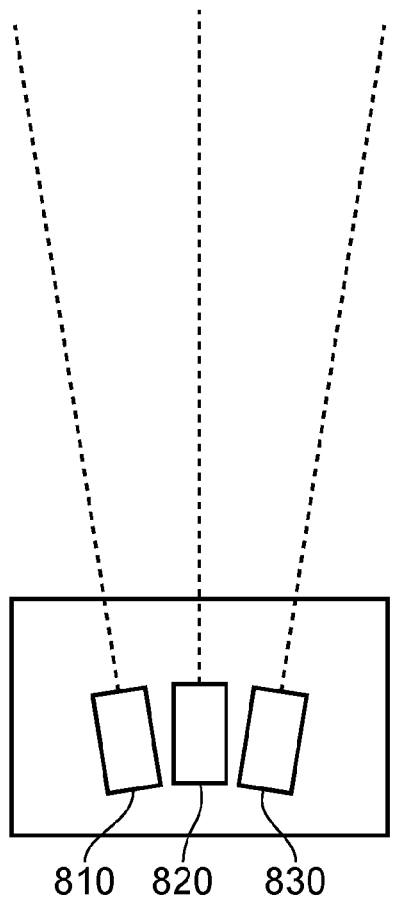
FIG. 17 schematically illustrates an array of light sources directed upwards.

FIG. 17 schematically illustrates an array of light sources 800, 810, 820 directed upwards. These may be arranged so as to project an asymmetric pattern on the ceiling and/or may be arranged to have different respective colours or wavelengths so that they can be distinguished in the captured images.

Figure 18:
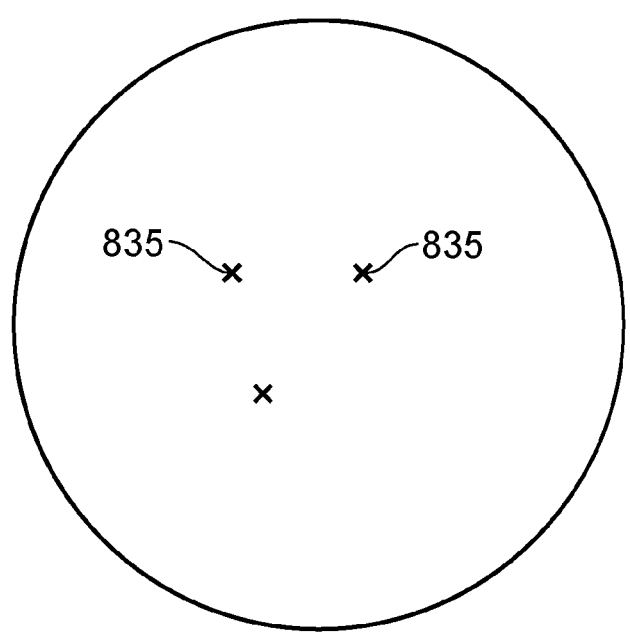
FIG. 18 schematically illustrates features of a captured image.
Figure 19:
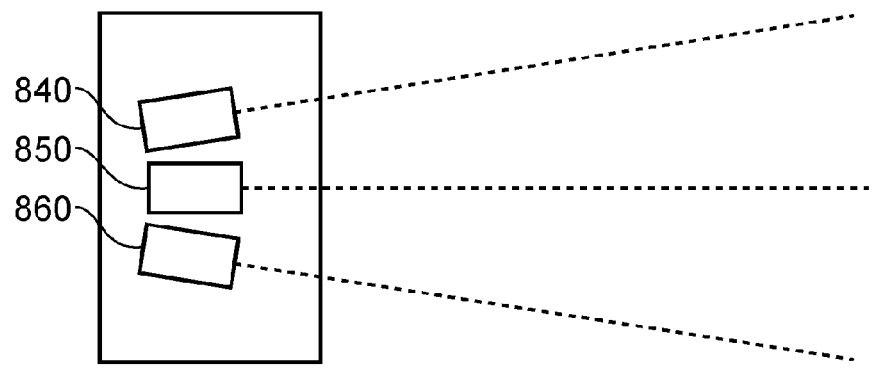
FIG. 19 schematically illustrates an array of light sources directed laterally.
Figure 20:
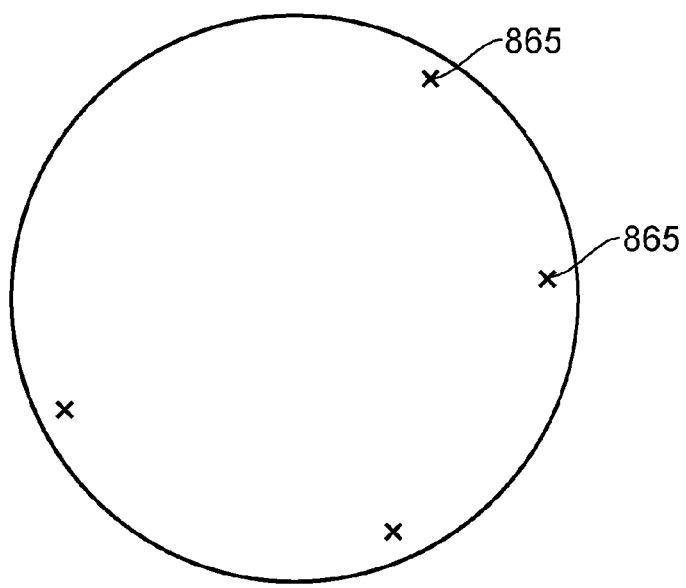
FIG. 20 schematically illustrates features of a captured image.

FIG. 18 schematically illustrates features of a captured image in which the light sources of FIG. 17 have been used. Points of light corresponding to the light sources are shown schematically as markings 835. As discussed earlier, features of the environment above the HMD tend to appear towards the centre of the image captured using the fisheye lens. As an alternative therefore, in order to provide more useful information about lateral rotation of the HMD, the light sources may be oriented more towards the sides rather than the upward direction. FIG. 19 schematically illustrates such an array of light sources 830, 840, 850 directed laterally. Note that although the nature of the drawing appears to indicate that the light sources are directly above one another, in embodiments of the invention they are rotationally spaced around the periphery of the horizontal plane, which is to say that they appear at different angular positions 865 in a captured image such as that shown schematically in FIG. 20.

Figure 21:
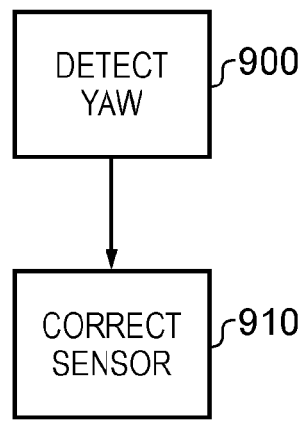
FIG. 21 schematically illustrates a yaw detection arrangement.

FIG. 21 schematically illustrates a yaw detection arrangement forming part of the functionality of an HMD, and comprising a yaw detector 900, which could correspond to the motion detector 530 of FIG. 12, and a sensor correction unit 910 operable to acceleration sensor 540 according to the yaw detected by the yaw detector 900. Note that in other embodiments, the unit 910 could be omitted, such that the output of the detector 900 forms the entirety of the detection of yaw of the HMD. The operation of the yaw detector 900 provides an example of a method of operation of a head mountable display (HMD) having an upward facing camera associated with a wide angle lens arranged to capture images of the environment of the HMD, the method comprising deriving an indication of yaw of the HMD from images captured by the upward facing camera at different points in time.

Figure 22:
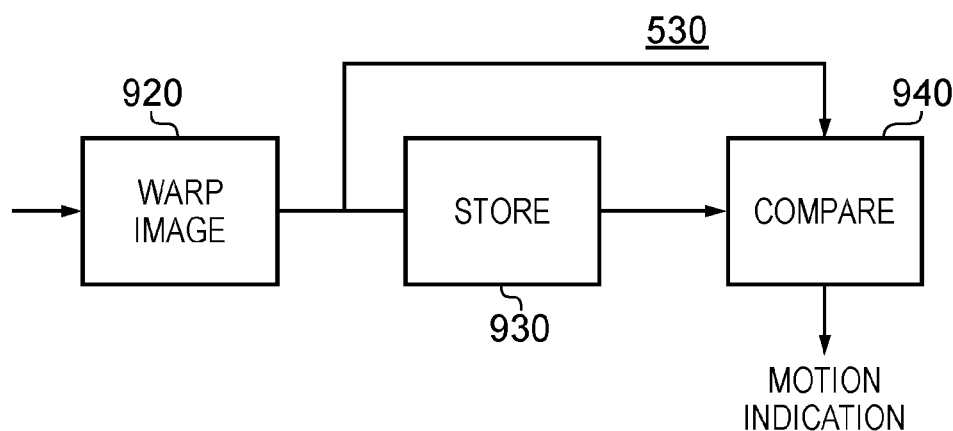
FIG. 22 schematically illustrates an image-based motion detection arrangement.

FIG. 22 schematically illustrates an image-based motion detection arrangement representing the operation of the motion detector 530 of FIG. 12. Camera images are received by an image warp unit 920 which carries out an image warp operation as discussed earlier. Note that, as indicated in the above discussion, the image warp operation is optional. The warped images are stored in an image store 930 and also passed to a comparator 940 which carries out a comparison operation using, for example, the techniques of FIG. 15 or FIG. 16 to derive a rotational change as between the current image output by the warp unit 920 and a previous image retrieved from the image store 930. The output is a motion indication as between the two images.

This provides an example of a head mountable display (HMD) comprising: an upward facing camera associated with a wide angle lens configured to capture images of the environment of the HMD; and an image comparator arranged to derive an indication of yaw of the HMD from images captured by the upward facing camera at different points in time.

Figure 23:
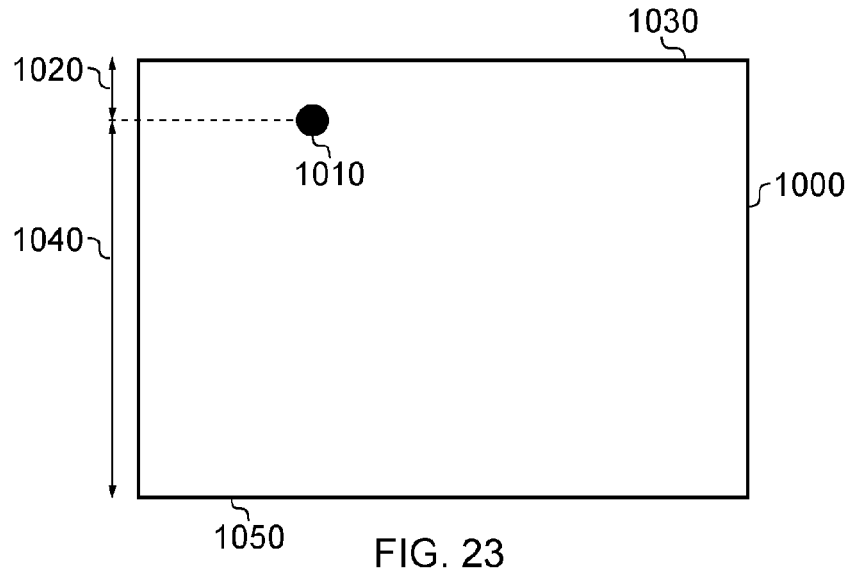
FIG. 23 is a schematic plan view of a room containing an HMD.

FIG. 23 is a schematic plan view of a room containing an HMD, in order to illustrate a potential issue which can occur in the use of the devices described above.

In FIG. 23, a solid line 1000 schematically illustrates the boundary of a room (for example, the outer walls of the room) as seen from above. A user wearing an HMD carrying the fisheye lens described above is illustrated as 1010. In general, the user is likely to be positioned somewhere other than the geometrical centre of the room, and in any event, it is unlikely that the room would be a perfect circle in plan view. So, the user is likely to be closer to some walls than to other walls. In the example of FIG. 23, the distance 1020 from a wall 1030 is considerably less than the distance of 1040 from a wall 1050. Similarly, the user is asymmetrically placed with respect to the left and right walls as drawn.

As discussed above, in at least some embodiments the image captured by the fisheye lens is representative of a 360° lateral view around the position 1010 of the HMD. However, the varying distance from the different walls can mean that the distortions which are inherent in such a 360° view image are different as between the different walls and different regions of the walls at respective distances from the HMD. If the HMD is at a significant distance from the nearest wall (for example, more than 2 m from the nearest wall) then the differences in may not be significant. However, if the HMD is closer than this distance to the nearest wall, the distortions could be quite noticeable.

Embodiments of the present techniques can make use of these distortions. Looking at the example in FIG. 23, the distortion of the image of the upper wall 1030 may be quite different to that applicable to the lower wall 1050. Given that the yaw of the HMD is being detected, different yaw values can be obtained from analysis of the image content relating to the two walls 1030, 1050 because the distortion can give an apparently different amount of motion in the images of the two walls.

Figure 24:
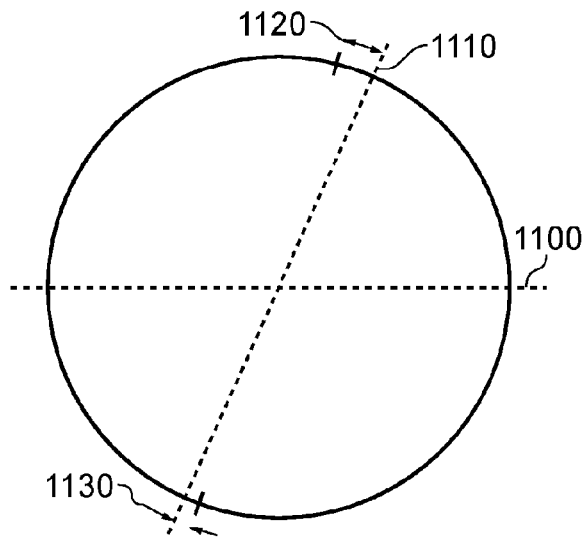
FIG. 24 schematically illustrates a viewpoint of a fisheye lens.

To address this issue, in some embodiments of the system, the apparent motion at pairs of diametrically opposite (or substantially opposite) image positions is detected. FIG. 24 schematically illustrates a plan view of a viewpoint of a fisheye lens (similar to that shown in FIG. 13) in which two example diameters 1100, 1110 are drawn in broken lines. Using the techniques described earlier, the system establishes the apparent degree of image motion at opposite positions on each of a set of two or more diameters. As an example, with respect to the diameter 1110, the degrees of apparent motion is detected at illustrated as movements 1120, 1130. In this example, it can be seen that there is a difference between the two detected motions 1120, 1130, which is due to the distortions discussed above. Of course, if an entirely undistorted image was available, the detected motion should be the same at any point on the circumference of the viewpoint shown in FIG. 24.

An example technique for dealing with this issue is that the system establishes the difference in the degrees of apparent motion measured at opposite points on a plurality of diameters, and uses the motion detected in respect of that diameter having the lowest detected difference between its opposite points. This should give the most reliable indication of the real yaw of the HMD from the image data available.

If a single lowest-difference pair is used, then the detected motion can simply be taken as the average of the motion indicated by the points of that pair. If more than one lowest difference pair is used, then all of the motion indications of the lowest difference pairs can be averaged. Optionally, the average can be weighted according to the differences, so that lower difference pairs contribute more to the weighted average.

A further possible feature can make use of the distortion in that in some embodiments the inconsistency between motion detected at opposite points of respective diameters in the 360° image can indicate translational movement of the HMD. This can be used in its own right as an indication of translation or can be combined with a SLAM-style mapping of the 3-D environment in the room, potentially using points above the HMD as well as points on the wall. It can further be combined with sensor data such as accelerometer data indicative of translational movement.

Figure 25:
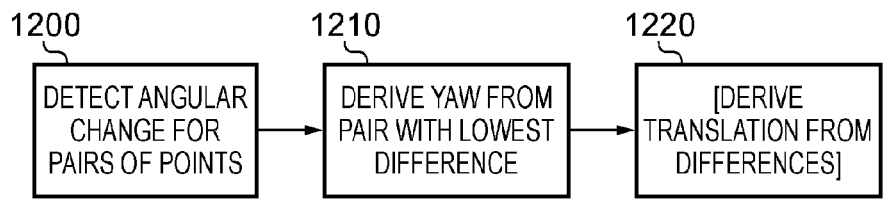
FIG. 25 schematically illustrates a yaw detector.

FIG. 25 schematically illustrates a yaw detector using these techniques, as a further example of the operation of the yaw detection step 900 in FIG. 21.

A detector 1200 and detects the angular change for pairs of points across multiple angularly spaced diameters of the fisheye image. Logic 1210 drives a yaw indication from one or more pairs of points exhibiting a lowest difference between their detected angular movements. Further optional logic 1220 is operable to derive a translation of measurement from the detected differences.

Figure 26:
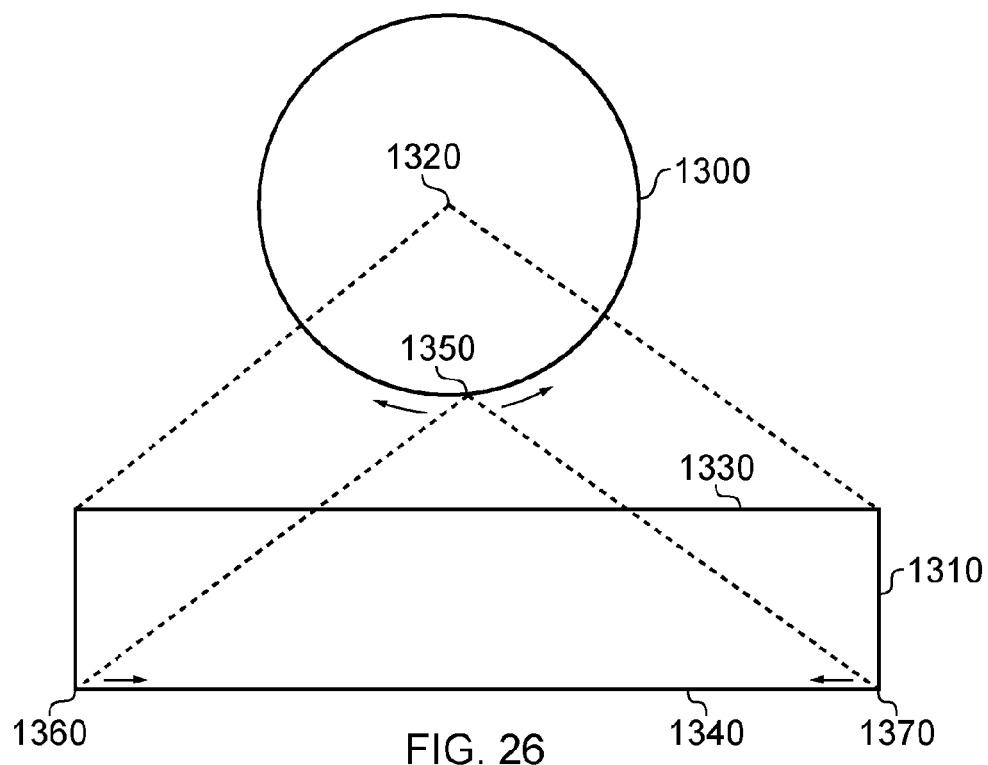
FIG. 26 schematically illustrates a transform between a fish-eye image and a rectangular image.

As a possible variation of the process shown in FIG. 14, in which an outer strip of the wide angle image is transformed into a rectangular image, FIG. 26 schematically illustrates a transform or image warping process between the whole of a fish-eye image 1300 and a rectangular image 1310. In this transformation or projection, a centre point 1320 of the image 1300 is expanded to form the entire upper (as drawn) boundary 1330 of the rectangular image 1310. The circumference of the image 1300 forms the other lengthwise boundary 1340 of the image 1310. An arbitrary point 1350 is represented by two extreme corners 1360, 1370 of the image 1310, with circumferential points other than the arbitrary point 1350 being mapped to corresponding positions along the boundary 1340.

Figure 27:
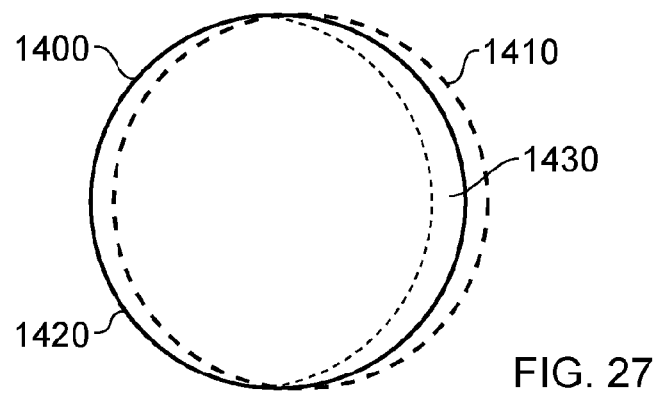
FIG. 27 schematically illustrates effects on a fish-eye image due to HMD orientation.

FIG. 27 schematically illustrates effects on a fish-eye image due to HMD orientation. The discussions above have been based on the assumption that the HMD is oriented horizontally, which is to say that, relative to the perpendicular optical axis of the lens 500, the HMD is not tilted either front-back or left-right. In practice, a tilt may occur. If this occurs during a comparison of successive images to detect yaw, it could lead to inaccuracies in the correlation process. FIG. 27 schematically illustrates a wide angle or fisheye image 1400 as captured, and the equivalent notional image 1410 which would have been captured at the HMD bin horizontal at the time of image capture.

Conveniently, however, the HMD in at least some examples contains sensors which can detect changes in orientation of this nature. If such a change is detected, then regions of the captured image can be ignored. In particular, a region 1420 between the outer boundary of the captured image 1400 and the boundary of the notional image 1410 is ignored. In some examples, further regions such as a region 1430 are also ignored in the captured image, so as to provide symmetry in terms of what material has been captured, between opposite sides of the captured image. In a further alternative, a circular region (not shown in FIG. 27 for clarity of the diagram) centred on the centre of the notional image 1410 and falling entirely within the captured image 1400 is retained and other image portions are discarded. In some examples, the circular region is made as large as possible without extending beyond the boundary of the captured image 1400. Using these techniques, images can be generated which at least in part compensate for the asymmetry which would otherwise be caused by the tilt of the HMD during image capture. Note that the images do not need to be actually cropped; it is sufficient just for the comparison process to ignore certain image regions in dependence upon the detected HMD tilt. This provides an example of the use of an HMD tilt detector, in which the image comparator is configured to ignore one or more portions of a captured image in dependence upon a current tilt of the HMD.

Figure 28:
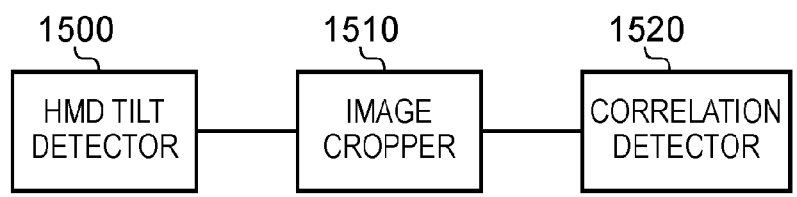
FIG. 28 schematically illustrates an orientation correction process.

FIG. 28 schematically illustrates an orientation correction process relevant to the techniques just discussed. A tilt detector 1500 configured to detect side to side or front to back tilt of the HMD controls and image cropper 1510 which crops the captured image as discussed above. The cropped image is then provided to a correlation detector and subsequent stages of processing which operate as already discussed.

Figure 29:
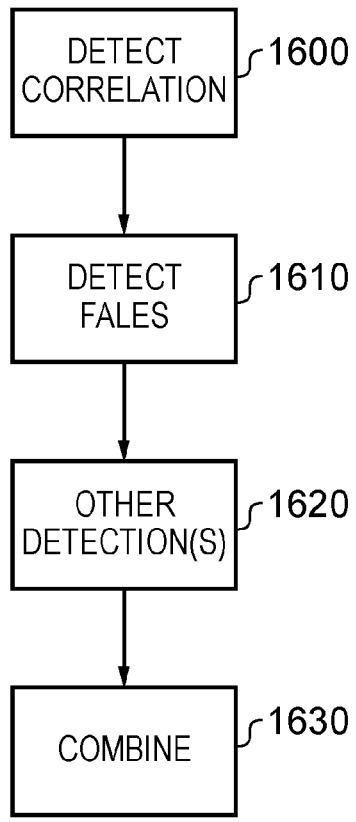
FIG. 29 is a schematic flowchart illustrating a combination of detections.

FIG. 29 is a schematic flowchart illustrating a combination of detections. In particular, it is possible to generate various different detections of yaw from the captured wide angle images. A step 1600 relates to a correlation detection as discussed earlier. A step 1610 users face detection within different peripheral regions of the captured image in order to detect HMD yaw. The face detection techniques themselves are known techniques, but their application here is novel. Other detection techniques such as detecting absolute differences between different image regions take place at a step 1620. Note that the step 1600, 1610, 1620 can take place in any order or indeed (at least in part) simultaneously. A step 1630 combines the results of the different detections, for example by giving prominence to one such detection or by averaging all detections which do not radically disagree (for example, by more than a threshold proportion or amount) with two or more other detections. This provides an example of the image comparator being configured to perform two or more detection techniques to detect HMD yaw, and to combine the results of the two or more detection techniques.

Figure 30:
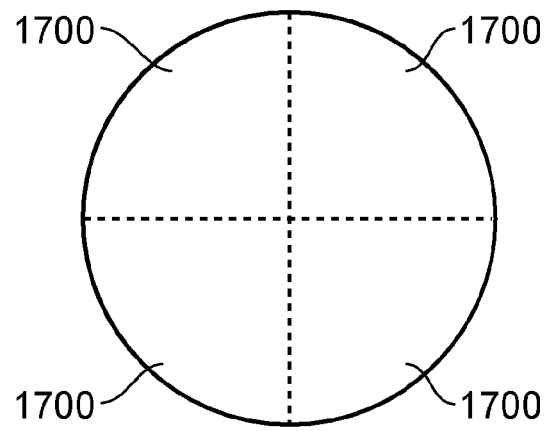
FIG. 30 schematically illustrates the division of an image into regions such as quadrants.

FIG. 30 schematically illustrates the division of a wide angle image of the type discussed above into regions such as quadrants 1700. Here, quadrants are merely examples of portions of the wide-angle image; for example, eighths could be used instead. The reason for this notional division of the image will be discussed with reference to FIG. 31.

Figure 31:
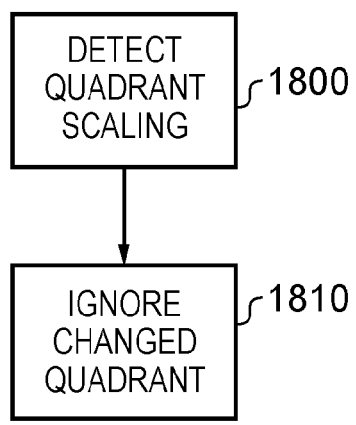
FIG. 31 is a schematic flowchart illustrating a detection process.

FIG. 31 is a schematic flowchart illustrating a detection process. In respect of each of the quadrants or other divisions, and step 1800 a scaling between successive images or other pairs of images is detected. The aim here is to detect a change in the size (rather than just the rotational position) of objects captured in that image region. If there is a change of at least a threshold amount or proportion between images, this can indicate that the HMD is close, in the direction corresponding to the quadrant or region under test, to a wall or other object. In such situations, detections of rotational movement (yaw) can be inaccurate because of the scaling which occurs as the HMD moves towards or away from the wall or large object. Accordingly, at a step 1810, any such quadrants or other regions of a particular image in which a scaling of at least the threshold amount or proportion has taken place between images are ignored in the detection of HMD yaw. This provides an example of an HMD as discussed, in which the image comparator is configured to detect inter-image scaling in two or more regions of the images; and not to use a region, in the detection of HMD yaw, in which inter-image scaling of more than a threshold scaling has been detected.

Further embodiments, as well as providing an indication of yaw, the fisheye lens image can also provide an image of the surroundings of the HMD, which can be re-projected into an image for display to the user of the HMD.

Accordingly, embodiments of the invention can provide a head mountable display (HMD) having an upward facing camera associated with a wide angle (such as a fisheye) lens arranged to capture images of the environment of the HMD, and an image comparator arranged to derive an indication of yaw of the HMD from images captured by the upward facing camera at different points in time.

In some embodiments, the images used may be successively captured images.

In some embodiments, an image warping process may be used to convert the captured images into a linear image format.

In some embodiments, a correlation process may be applied as between the different images captured by the upward facing camera. In other embodiments, feature points may be identified in the different images, and the positions in the images of the feature points may be used to provide an indication of rotational movement of the HMD between the two images.

In some embodiments the processor is operable to detect indications of rotational movement from a plurality of pairs of image positions, each pair representing opposite viewpoints of the camera, and to derive an indication of rotational movement from one or more pairs exhibiting the lowest difference between the viewpoints of that pair.

In some embodiments, the lens may have a field of view of substantially 180°, for example being a fisheye lens.

Embodiments of the invention also provide a system comprising an HMD and one or more of a base device such as a games console and an intermediate device such as a break-out box.

Embodiments of the invention can also provide a method of operation of a head mountable display (HMD) having an upward facing camera associated with a wide angle (such as a fisheye) lens arranged to capture images of the environment of the HMD, the method comprising deriving an indication of yaw of the HMD from images captured by the upward facing camera at different points in time.

It will be appreciated that the various techniques described above may be carried out using software, hardware, software programmable hardware or combinations of these. It will be appreciated that such software, and a providing medium by which such software is provided (such as a machine-readable non-transitory storage medium, for example a magnetic or optical disc or a non-volatile memory) are considered as embodiments of the present invention.

Obviously, numerous modifications and variations of the present disclosure are possible in light of the above teachings. It is therefore to be understood that within the scope of the appended claims, the invention may be practised otherwise than as specifically described herein.

The invention claimed is:

1. A head mountable display (HMD) comprising:
    an upward facing camera associated with a wide angle lens configured to capture images of an environment of the HMD;
    an image comparator operatively coupled to the upward facing camera, the image comparator being arranged to derive an indication of yaw of the HMD from images captured by the upward facing camera at different points in time; and
    a processor configured to identify feature points in the images captured at different points in time, and to detect positions in the images of the identified feature points so as to provide an indication of rotational movement of the HMD between two respective images, in which the processor is configured to detect indications of the rotational movement from a plurality of pairs of image positions, each pair representing opposite viewpoints of the camera, and in which the processor is further configured to derive the indication of rotational movement from one or more pairs exhibiting a lowest difference between the viewpoints of that pair.

2. An HMD according to claim 1, in which the lens is a fisheye lens.

3. An HMD according to claim 2, in which the lens has a field of view of at least 140°.

4. An HMD according to claim 1, in which the images are successively captured images.

5. An HMD according claim 1, configured to apply an image warping process to convert the captured images into a linear image format.

6. An HMD according to claim 1, wherein the processor is further configured to apply a correlation process as between the images captured at different points in time by the upward facing camera.

7. An HMD according to claim 1, in which the image comparator is configured to perform two or more detection techniques to detect HMD yaw, and to combine the results of the two or more detection techniques.

8. An HMD according to claim 1, further comprising:
    a tilt detector;
    and in which the image comparator is configured to ignore one or more portions of a captured image in dependence upon a current tilt of the HMD.

9. A system, comprising:
    a head mountable display (HMD) including:
        an upward facing camera associated with a wide angle lens configured to capture images of an environment of the HMD;
        an image comparator operatively coupled to the upward facing camera, the image comparator being arranged to derive an indication of yaw of the HMD from images captured by the upward facing camera at different points in time; and
        a processor configured to identify feature points in the images captured at different points in time, and to detect positions in the images of the identified feature points so as to provide an indication of rotational movement of the HMD between two respective images, in which the processor is configured to detect indications of the rotational movement from a plurality of pairs of image positions, each pair representing opposite viewpoints of the camera, and in which the processor is further configured to derive the indication of rotational movement from one or more pairs exhibiting a lowest difference between the viewpoints of that pair; and
    one or more of a base device and an intermediate device operatively coupled to the HMD.

10. A method of operation of a head mountable display (HMD) having an upward facing camera associated with a wide angle lens arranged to capture images of the environment of the HMD, the method comprising:
    deriving, by one or more processors, an indication of yaw of the HMD from images captured by the upward facing camera at different points in time;
    identifying feature points in the images captured at the different points in time;
    detecting positions in the images of the identified feature points so as to provide an indication of rotational movement of the HMD between two respective images;
    detecting indications of the rotational movement from a plurality of pairs of image positions, each pair representing opposite viewpoints of the camera; and
    deriving the indication of rotational movement from one or more pairs exhibiting a lowest difference between the viewpoints of that pair.

11. A non-transitory computer-readable storage medium on which computer readable instructions are stored, the instructions, when executed by one or more processors, causing the one or more processors to execute a method of operation of a head mountable display (HMD) having an upward facing camera associated with a wide angle lens arranged to capture images of the environment of the HMD, the method comprising:
    deriving an indication of yaw of the HMD from images captured by the upward facing camera at different points in time;
    identifying feature points in the images captured at the different points in time;
    detecting positions in the images of the identified feature points so as to provide an indication of rotational movement of the HMD between two respective images;
    detecting indications of the rotational movement from a plurality of pairs of image positions, each pair representing opposite viewpoints of the camera; and
    deriving the indication of rotational movement from one or more pairs exhibiting a lowest difference between the viewpoints of that pair.

12. A head mountable display (HMD) comprising:
    an upward facing camera associated with a wide angle lens configured to capture images of an environment of the HMD; and
    an image comparator operatively coupled to the upward facing camera, the image comparator being arranged to derive an indication of yaw of the HMD from images captured by the upward facing camera at different points in time;

in which the image comparator is configured to detect inter-image scaling in two or more regions of the captured images, and not to use a region, in the detection of HMD yaw, in which inter-image scaling of more than a threshold scaling has been detected.

13. An HMD according to claim 12, comprising a processor configured to apply a correlation process as between the images captured at different points in time by the upward facing camera.

14. An HMD according to claim 12, further comprising:
a tilt detector;
and in which the image comparator is configured to ignore one or more portions of a captured image in dependence upon a current tilt of the HMD.

15. An HMD according to claim 12, in which the images are successively captured images.

16. An HMD according claim 12, configured to apply an image warping process to convert the captured images into a linear image format.

17. A system, comprising:
a head mountable display (HMD) including:
   an upward facing camera associated with a wide angle lens configured to capture images of an environment of the HMD; and
   an image comparator operatively coupled to the upward facing camera, the image comparator being arranged to derive an indication of yaw of the HMD from images captured by the upward facing camera at different points in time;
   in which the image comparator is configured to detect inter-image scaling in two or more regions of the captured images, and not to use a region, in the detection of HMD yaw, in which inter-image scaling of more than a threshold scaling has been detected; and
one or more of a base device and an intermediate device operatively coupled to the HMD.

18. A method of operation of a head mountable display (HMD) having an upward facing camera associated with a wide angle lens arranged to capture images of the environment of the HMD, the method comprising:
   deriving, by one or more processors, an indication of yaw of the HMD from images captured by the upward facing camera at different points in time;
   detecting inter-image scaling in two or more regions of the captured images; and
   not using a region, in the detection of HMD yaw, in which inter-image scaling of more than a threshold scaling has been detected.

* * * * *